Feb. 6, 1968
L. J. JENN ETAL
3,367,320
SELF-VENTILATING COOKING RANGE
Filed July 28, 1966
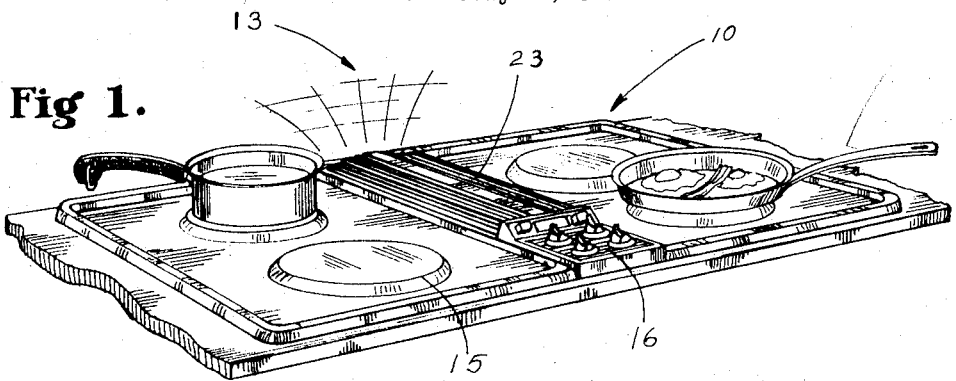
Fig. 1.
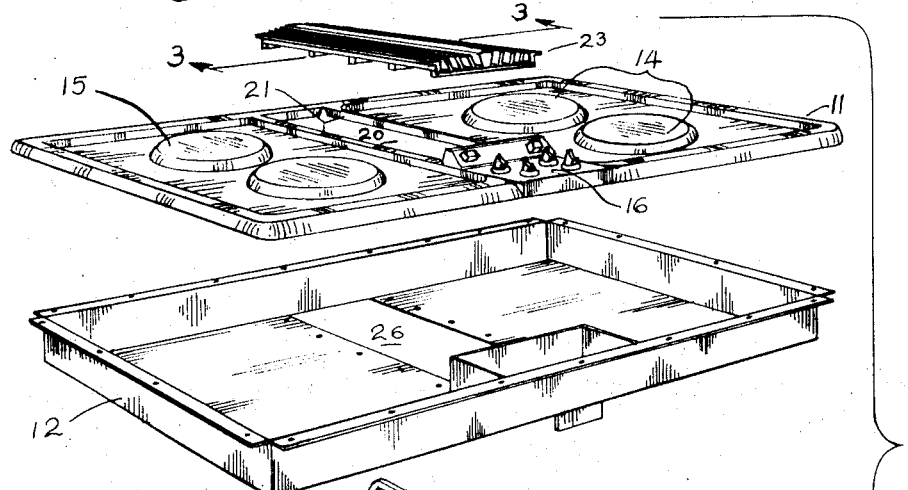
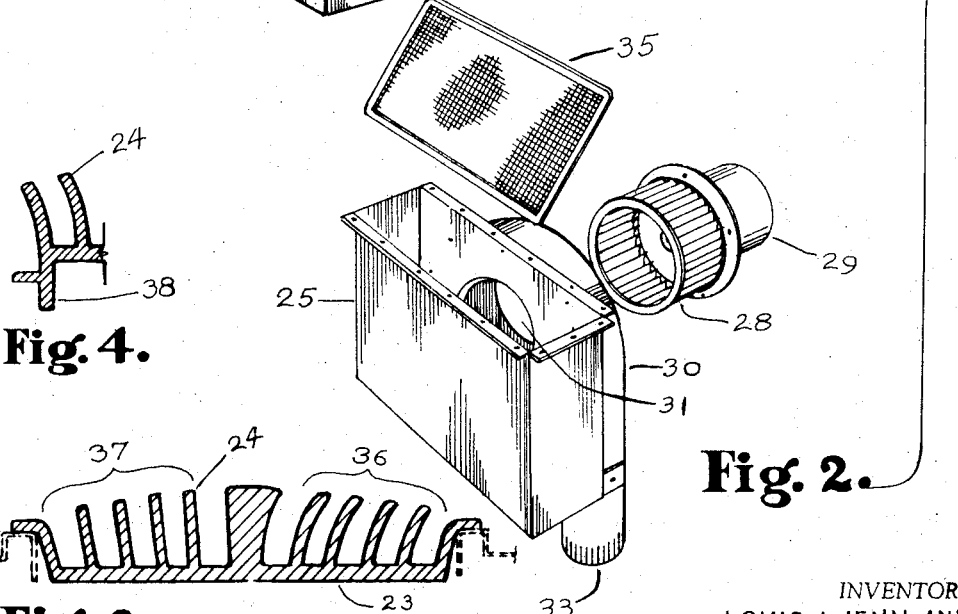
Fig. 4.
Fig. 3.
Fig. 2.
INVENTORS
LOUIS J. JENN AND
THOMAS R. FIELD
BY *Gerald L. Price*
Attorney

BEST AVAILABLE COPY

United States Patent Office 3,367,320
Patented Feb. 6, 1968

3,367,320
SELF-VENTILATING COOKING RANGE
Louis J. Jenn and Thomas R. Field, Indianapolis, Ind., assignors to Jenn-Air Corporation, Indianapolis, Ind., a corporation of Indiana
Filed July 28, 1966, Ser. No. 568,522
7 Claims. (Cl. 126—300)

ABSTRACT OF THE DISCLOSURE

An apparatus for capturing and exhausting grease laden or odoriferous vapors produced when cooking on surface heating elements of a cooking range, and including provision for establishing a negative pressure region immediately above the surface heating elements and substantially coextensive therewith, and for removing such vapors from the region through a suitable plenum housing and from thence to appropriate venting apparatus.

---

The present invention relates generally to exhaust systems for cooking ranges and more particularly, to an improved self-ventilating cooking range capable of capturing and removing cooking vapors before they can permeate the kitchen.

Many attempts have been made to eliminate the nuisance created by the occurrence in the kitchen of hot grease laden cooking vapors. The most widely accepted method of coping with this problem is the familiar hood structure which overhangs a range top. While satisfactory vapor removal can be obtained from hoods of this type, several undesirable features are inherent in their use. For example, in order not to obstruct the working area above the range top, kitchen exhaust hoods are in practice positioned too high above the heating elements of the range to effectively capture cooking vapors without the use of a loud and powerful exhaust fan, and after being in use a relatively short time, their inside surfaces tend to collect and accumulate grease and dirt creating both appearance and cleaning problems. In addition, their large and bulky appearance detracts from and greatly hampers the design of modern kitchens.

It has been recognized in recent years that the most effective method of removing vapors occurring as a result of range top cooking is to capture these vapors as close to their point of occurrence as possible. To accomplish this, numerous embodiments have been devised employing some form of duct or flue structure either overhanging or projecting upwardly from the range top with an intake opening located in close proximity to the cooking vessel or the food itself. While these methods are capable of accomplishing their intended purpose, several limitations are inherent in this type of approach. For example, the duct or flue structure required to effectively capture the cooking vapors from a group of heating elements on a range surface presents an obstruction in the working area above the range, and to provide a flue or duct that is retractable when not in use requires a relatively complex and expensive structure.

Accordingly, it is the general aim of the present invention to provide a new and improved integral self ventilating cooking range which effectively captures cooking vapors at a close proximity to their source without the use of a hood, flue, or ductwork overlying or extending through the range surface.

A further object of the invention is to provide an apparatus of the type referred to which is characterized by its high efficiency and reliability in operation, yet which is simple, compact, and economical in construction and which presents both an aesthetic and functional appearance in a kitchen.

Other objects and advantages of the invention will appear from the following description taken in conjunction with the accompanying drawings in which:

FIGURE 1 is a perspective view of an exemplary apparatus embodying the features of the present invention here depicting a counter top range with two cooking vessels placed thereon;

FIGURE 2 is an exploded perspective view of the counter top range illustrated in FIGURE 1 additionally showing the structure located below the counter top;

FIGURE 3 is an end view illustrating a section taken on the line 3—3 in FIGURE 2; and FIGURE 4 is a fragmentary view of a section similar to that of FIGURE 3, but here showing a portion of a modified grill.

While the present invention is susceptible of various modifications and alternative constructions, illustrative embodiments are shown in the drawings and will herein be described in detail. It should be understood, however, that it is not intended to limit the invention to the particular forms disclosed, but, on the contrary, the intention is to cover all modifications, equivalents, and alternative constructions falling within the true spirit and scope of the invention as expressed in the appended claims.

Referring now to FIGURES 1 and 2, an exemplary counter top cooking range, generally indicated at 10, is illustrated, including a surface plate 11, a burner box 12, a pair of spaced series 14 of aligned heating elements 15, and a control panel generally indicated at 16 to operate the heating elements. While the illustrated embodiment depicts the heating elements 15 as being the conventional round gas or electric type, it is understood that they also could be in the form of a grill, griddle, recessed vat or the like and still be in keeping with the broad scope of the invention. It is further understood that the counter top type of range is illustrated by way of example only, and that this invention is equally adaptable to other types and styles of range construction such as, for example, free standing.

In accordance with one of the important aspects of the present invention, provision is made for removing the vapors occurring as a result of cooking on the range top 10, in a new and improved manner. This is accomplished by the creation of a low pressure zone directly above the surface plate 11 which extends adjacently to the area immediately above the heating elements 15 in each series 14. This low pressure zone is created and maintained under steady state conditions by continually removing the air present in this zone at a high volume rate. Consequently, the air immediately adjacent to this low pressure zone is continually drawn into the zone at a high volume rate to replace the removed air and thus cooking vapors present in this "make up" air will also be drawn into the zone and captured before they can premeate the kitchen.

Contrasted with the creation of a low pressure zone which provides cooking vapor capture and removal to an entire complement of heating elements on a range surface plate, is the burner ventilating system taught in U.S. Patent 3,002,513 to M. R. Morasch. This patent discloses the provision of a circumferential inlet slot, adjacent to and co-axial with each individual range burner element on a range top to remove cooking vapors. While the apparatus of the Morasch patent has utility for the purpose stated, the structure disclosed requires an elaborate and costly ducting and dampering arrangement beneath the surface of the range top. Furthermore, the vapor capture ability of air drawn through an intake slot of the type disclosed, tends to rapidly diminish with respect to its distance from the slot. Accordingly, to effectively capture vapors given off from a tall cooking vessel, an extremely high velocity of air must be present at the intake slot which in turn requires an exceedingly high capacity fan. Additionally, Morasch's circumferential inlet slot which encompasses the burner tends to draw a considerable amount of heat away from the burner resulting in cooking time being appreciably increased.

In carrying out the present invention, provision is made for creating a low pressure zone, a representation of a cross section of which is generally indicated at 13, capable of capturing vapors occurring from cooking on any heating element 15 in each series 14. To accomplish this, an intake opening is provided on the surface plate 11 through which air is drawn downwardly at a large volume rate. As best shown in FIGURE 2, the intake opening in the exemplary apparatus is in the form of an aperture 20 which is positioned between the two series 14 of heating elements 15 and is of a generally rectangular configuration with a pair of longitudinal edges 21, each of which is juxtaposed to one of the two series 14, and adjacent each heating element 15 in the series the arrangement being such that the air intake aperture is substantially coextensive with each series 14 of heating elements 15.

In order to continually move a high volume rate of air downwardly through the aperture 20 to create and maintain the low pressure zone thereabove, plenum housing 25 is provided which depends from the aperture 20 and passes through aperture 26 which is provided in the burner box 12. A power driven fan 28, preferably of the centrifugal type, is housed in scroll 30 which in turn is mounted on a sidewall of the plenum housing 25 with its inlet opening 31 communicating therethrough. The fan 28 is driven by motor 29 which may be energized by any suitable means (not shown) such as a switch on the control panel 16, or in conjunction with the energization of a heating element 15.

The outlet opening 33 of the scroll may be attached to ducting running to the outside, or if desired, the captured vapors may be filtered and exhausted back into the kitchen.

In order to prevent objects such as kitchen utensils from falling through the aperture 20 and to further enhance the appearance of the range top, a decorative grill 23 is provided to cover the aperture 20. As illustrated in FIGURE 3, the cross section of the grill 23 in the preferred embodiment comprises a plurality of longitudinally directed ribs 24 sized and positioned in a manner so as to impart the appearance of substantially closing the aperture 20 while actually allowing air to pass with little or no appreciable loss in pressure.

In order to control the configuration of the low pressure zone, the ribs 24 may be of various configurations and formed in various angular relationships with the aperture 20.

As shown particularly in FIGURE 3, the left series 37 of ribs 24 in the grill 23 are set at a steeper angle than those in the right series 36. The purpose of this is to extend the low pressure zone on the right side of the range slightly over the right series 14 of heating elements 15 so as to more effectively capture cooking vapors occurring at a low level such as in a frying pan or on a griddle plate. In the exemplary apparatus, the grill 23 may be lifted out and replaced in a reversed end to end manner so as to provide either series 14 of heating elements 15 with either series of ribs 24.

It will be appreciated by those skilled in the art, that the low pressure zone may in certain instances tend to disturb the operation of gas burning heating elements or draw heat away from a heating element. To avoid the occurrence of this situation, a grill with a modified sidewall 38 (FIGURE 4) may be employed to raise the intake opening in order that the low pressure zone will be above the height of the heating elements.

While the grill 23 of the exemplary apparatus has been described in considerable detail, it is pointed out that any number of alternate grill patterns may be employed, or that the grill can be eliminated entirely and that a series of slots, holes, louvers, or the like may be provided in the surface plate 11 of the range so as to provide an intake opening and still be in keeping with the broad aspects of the invention.

In carrying out the present invention, provision is made for removing the grease in the cooking vapors drawn into the low pressure zone and through the aperture 20. In furtherance of this aim, a filter 35 is provided in the plenum chamber 25. As seen in FIGURE 2, the filter 35 is transversely disposed within the plenum housing 25 thereby providing a maximum filtering area. The filter 35 is preferably of the metallic type which may be removed and periodically renewed by washing it in a strong detergent. Access to the filter is obtained by removing the grill.

Those skilled in the art will appreciate from the foregoing description and the accompanying drawings that there has herein been illustrated and described an illustrative cooking range in which the exemplary air inlet opening 20 is disposed in the plane of the surface plate 11, but that minor deviations therefrom can be made without departing from the true scope of the invention. For example, the air inlet opening 20 can be raised slightly to a plane somewhat above and parallel to the plane of the heating elements 15 in which event the low pressure zone or negative pressure region established would still be substantially coextensive with the heating elements and would still fall primarily in the area where the diverse cooking vessels were situated as contrasted with conventional hoods or conventional retractable flues wherein the primary negative pressure region is disposed substantially above the surfaces of the heating elements. Thus, it is in this context that the term "substantially flush" has been used in the appended claims and it will be understood that such phrase is intended to connote not only an arrangement in which the air inlet opening is disposed physically in the plane of the heating elements, but also those situations wherein it is somewhat above such plane but still substantially in the plane of the cooking vessels.

Having thus described our invention, we claim:

1. For use with a cooking range of the type having a horizontal surface and at least one series of substantially aligned heating elements positioned thereon for cooking purposes, the combination thereof with apparatus for capturing and removing grease laden or odoriferous vapors produced while cooking on said range, said apparatus comprising, means defining an elongate air intake opening substantially flush with said surface, said opening being in closely proximate parallel relation to and substantially longitudinally coextensive with said series of heating elements, a plenum housing coupled to said air intake opening defining means and disposed beneath said surface, and power driven air moving means communicating with said plenum housing for continuously drawing a high volume rate of air through said air intake opening and plenum housing and thereby create a region of negative air pressure immediately above said opening, said negative air pressure region extending over said series of heating elements and being substantially coextensive therewith whereby the grease laden or odoriferous vapors present in the air above said surface and said series of heating elements is positively captured and removed through said opening and said plenum housing.

2. The apparatus as set forth in claim 1 further characterized in that said cooking range is provided with two parallel series of substantially aligned heating elements and said air intake opening is disposed between said two parallel series.

3. The apparatus as set forth in claim 1 further characterized in that said air intake opening comprises an elongate aperture in said horizontal surface.

4. The apparatus as set forth in claim 1 further characterized in that a grill is removably positioned within said opening.

5. The apparatus as set forth in claim 4 further characterized in that said grill includes a plurality of longitudinally extending ribs substantially coextensive with said series of heating elements.

6. The apparatus as set forth in claim 1 further comprising grease removing means positioned in said plenum housing in a manner whereby said grease removing means will lie in the path of the air and airborne matter passing through said plenum housing.

7. The apparatus as set forth in claim 2 further characterized in that a grill is removably positioned within said opening, said grill having a plurality of longitudinally extending ribs with the ribs closest to one of said two series of heating elements being disposed at a steeper angle than the ribs closest to the other of said two series of heating elements.

References Cited
UNITED STATES PATENTS

| | | | |
|---|---|---|---|
| 2,674,991 | 4/1954 | Schaefer | 126—299 |
| 3,102,533 | 9/1963 | Jenn et al. | 126—303 |

FREDERICK L. MATTESON, JR., *Primary Examiner.*

E. G. FAVORS, *Assistant Examiner.*

REEXAMINATION CERTIFICATE (1st)

United States Patent [19]
Jenn et al.

[11] B1 3,367,320
[45] Certificate Issued Dec. 29, 1981

[54] SELF-VENTILATING COOKING RANGE

[75] Inventors: Louis J. Jenn; Thomas R. Field, both of Indianapolis, Ind.

[73] Assignee: Jenn-Air Corporation, Indianapolis, Ind.

Reexamination Request
No. 90/000,027, Jul. 14, 1981

Reexamination Certificate for:
Patent No.: 3,367,320
Issued: Feb. 6, 1968
Appl. No.: 568,522
Filed: Jul. 28, 1966

[51] Int. Cl.³ .................................. F24C 15/20
[52] U.S. Cl. .................................. 126/300
[58] Field of Search ....... 126/299, 300, 303; 98/115R

[56] References Cited

U.S. PATENT DOCUMENTS

| | | |
|---|---|---|
| 2,076,479 | 1/36 | O'Connell. |
| 2,674,991 | 4/1954 | Schaefer............................ 126—299 |
| 3,002,513 | 10/61 | Morasch. |
| 3,102,533 | 9/1963 | Jenn et al............................ 126—303 |

*Primary Examiner*—Edward G. Favors.

[57] ABSTRACT

An apparatus for capturing and exhausting grease laden or odoriferous vapors produced when cooking on surface heating elements of a cooking range, and including provision for establishing a negative pressure region immediately above the surface heating elements and substantially coextensive therewith, and for removing such vapors from the region through a suitable plenum housing and from thence to appropriate venting apparatus.

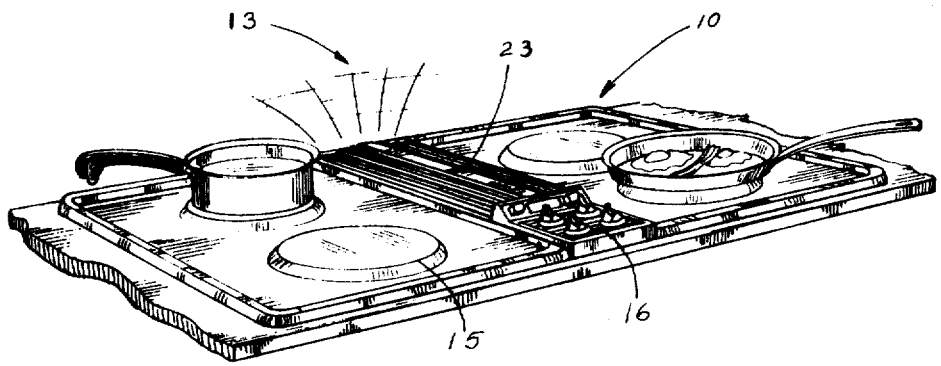

REEXAMINATION CERTIFICATE ISSUED UNDER 35 U.S.C. 307.

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *